United States Patent
Hourn et al.

(10) Patent No.: US 7,488,370 B2
(45) Date of Patent: Feb. 10, 2009

(54) REDUCING CYANIDE CONSUMPTION IN GOLD RECOVERY FROM FINELY GROUND SULPHIDE ORES AND CONCENTRATES

(75) Inventors: Michael M Hourn, Carindale (AU); Rodrigo U Ventura, Sunnybank (AU); John A Willis, Sherwood (AU); David Winborne, Mitchelton (AU)

(73) Assignee: Xstrata Queensland Ltd., Brisbane, Queensland (AU)

( * ) Notice: Subject to any disclaimer, the term of this patent is extended or adjusted under 35 U.S.C. 154(b) by 298 days.

(21) Appl. No.: 10/533,317

(22) PCT Filed: Oct. 22, 2003

(86) PCT No.: PCT/AU03/01400

§ 371 (c)(1),
(2), (4) Date: Feb. 8, 2006

(87) PCT Pub. No.: WO2004/042094

PCT Pub. Date: May 21, 2004

(65) Prior Publication Data

US 2006/0185475 A1   Aug. 24, 2006

(30) Foreign Application Priority Data

Nov. 6, 2002  (AU) ............................. 2002952490

(51) Int. Cl.
*C22B 3/04* (2006.01)

(52) U.S. Cl. .............................. 75/743; 75/744; 75/735; 75/737; 75/733

(58) Field of Classification Search ................... 75/744, 75/743, 735, 737, 733
See application file for complete search history.

(56) References Cited

U.S. PATENT DOCUMENTS 5,869,012 A * 2/1999 Jones ........................... 423/24
6,833,021 B1 * 12/2004 Hourn et al. ................... 75/744

FOREIGN PATENT DOCUMENTS

| AU | 73192/87 | 11/1988 |
| AU | 71751/2000 | 5/2001 |
| EP | 177292 | 5/1991 |
| EP | 514471 | 6/1994 |
| WO | WO 00/17407 | 3/2000 |

OTHER PUBLICATIONS

Derwent Abstract Accession No. 93-345541/44, Class M25, CN 1067270 A (XI-AN College Metallurgical Building) Dec. 23, 1992.
Derwent Abstract Accession No. 93-345542/44, Class M25, CN 1067271 A (XI'AN College Metallurgical Building) Dec. 23, 1992.
Derwent Abstract Accession No. 96-009105/01, Class M25, RU 2034062 C1 (Chem Techn Res Inst) Apr. 30, 1995.
Derwent Abstract Accession No. 2000-304187/27, Class J01, CN 1228480 A (Inst Metals Res Chinesse Acad Sci) Sep. 15, 1999.

* cited by examiner

*Primary Examiner*—Roy King
*Assistant Examiner*—Tima M McGuthry-Banks
(74) *Attorney, Agent, or Firm*—Hoffman, Wasson & Gitler, P.C.

(57) ABSTRACT

Precious metals such as gold can be extracted from a refractory ore using a conventional cyanide leaching step and with reduced cyanide consumption by pre-treating the ore prior to cyanide leaching. The refractory ore is pretreated by fine grinding and an initial leaching step which uses inexpensive limestone and lime to maintain the initial leach relatively alkaline. Oxygen is added to the initial leaching step and the conditions are carefully controlled to only partially oxidize the ground ore to between 9-15%. The initial leaching step can be carried out at temperatures of less than 100 degrees C. and at atmospheric pressures. The pre-treated ore is then leached by a conventional cyanide leaching step to recover the precious metal and cyanide consumption can be reduced by more than two thirds.

10 Claims, 1 Drawing Sheet

REDUCING CYANIDE CONSUMPTION IN GOLD RECOVERY FROM FINELY GROUND SULPHIDE ORES AND CONCENTRATES

FIELD OF THE INVENTION

This invention is directed to a process by which gold, silver and other precious minerals can be recovered from a refractory material such as an ore/concentrate/residue in such a manner that the amount of cyanide consumption is reduced.

BACKGROUND ART

Extraction of precious minerals such as gold from an ore or concentrate using cyanide leaching is well-known. The cyanide leaching must be conducted under alkaline conditions.

Gold in sulphide mineralisation can occur in several forms:
  free gold and electrum and fine inclusions of these particles in sulphide minerals
  gold compounds (tellurides and selenides)
  gold locked in the lattice of pyrite, arsenopyrite, stibnite etc (invisible gold)

In free milling ores, particulate free gold and electrum can be recovered by conventional gravity and cyanidation methods. When these particles are present as fine inclusions in sulphide minerals, fine grinding is used to liberate the particles prior to cyanide leaching.

Fine gold particles locked in other minerals can be liberated by fine grinding from p80≈70μ to p80≈12μ. This liberation of fine gold particles from sulphides and quartz gange particles by fine grinding and cyanide leaching is well known.

It has been found that fine grinding to circa 10 microns and leaching with sodium cyanide can recover the majority of the free gold and the gold present as gold compounds. High pH (~11-12) high cyanide concentration (2-5000 ppm NaCN vs 200-300 ppm used conventionally) and long leach times are required, (48-72 hours vs 18-24 hours required conventionally). Under these conditions, recoveries of 80-90% for gold can be achieved with consumptions of lime of 5-15 kg/t and 12-20 kg/t of sodium cyanide. Normal commercial operation results in consumption of 1.5-5 kg/t of lime and 1.5-2.5 kg/t of sodium cyanide.

During the fine grinding process, the sulphide minerals are also finely ground and a large surface area of fresh unoxidised sulphide mineralisation is exposed. It is this sulphide surface which reacts with cyanide during cyanide leaching for gold extraction to form thiocyanates and other thio species. This results in the high cyanide consumption observed during cyanide leaching of finely ground sulphidic gold ores.

It has been reported that fine grinding of pyrite concentrates by stirred ball mills, the LURGI centrifugal ball mill and the Sweco vibrating mill produced significant recoveries in gold extraction by cyanide leaching. The grind sizes achieved were p50 of 2-8μ. During leaching, the cyanide consumption was double that observed at a coarser grind.

Some types of ores are not able to be leached using cyanide, as the precious minerals are locked in the ore in such a manner that extraction using cyanide does not work. These types of ores can be called refractory ores. A typical refractory ore comprises a sulphide ore and a carbonaceous ore.

In order to release the precious minerals from refractory ores (thereby allowing cyanide leaching to be carried out) it is known to initially pre-treat the ore by roasting, by bacterial leaching, and to use chemical leaching at elevated temperatures and pressures all of which increases the cost of recovering the precious minerals from the ore/concentrates.

Most pre-treating leaching processes use oxygen and acidic conditions. Once the ore/concentrate has been treated, the acid must be neutralised prior to cyanide leaching which requires less acid or more alkaline conditions. This increases the cost of extraction of the precious minerals.

Alkaline leaching is known but alkaline leaching is not very efficient with refractory materials.

International patent application PCT/AU99/00795 describes an alkaline leaching process to extract precious metals such as gold. The alkaline leaching process requires fine grinding of the ore and lime and/or limestone is used as the alkaline reagent. Oxygen is used as the oxidising agent and the process is continued until approximately 90% of sulphide oxidation had taken place. The resultant product is subjected to cyanide leaching to remove gold and other precious minerals.

A disadvantage with the above alkaline leaching process is that the amount of cyanide consumed during the extraction process is rather high which adds to the cost of the overall process. Also, the reaction time is quite long.

During the fine grinding process, the sulphide minerals are finely ground and a large surface area of fresh unoxidised sulphide mineralisation is exposed. It is this sulphide surface which reacts with cyanide during cyanide leaching for gold extraction to form thiocyanates and other thio species. This results in the high cyanide consumption observed during cyanide leaching of finely ground sulphidic gold ores. In our previous process described in the above International patent application, the sulphide was almost totally oxidised but even so, there was still a large consumption of cyanide.

SUMMARY OF THE INVENTION

The present invention is directed to the discovery that the amount of cyanide consumed during an alkaline extraction process can be remarkably reduced (for instance by up to 66%) by only partially oxidising the ore/concentrate in a pretreatment step prior to extraction with cyanide.

In one form, the invention resides in a process for extracting gold and other precious metals from a refractory material (such as an ore/concentrate—such as a sulphide ore), the method comprising fine grinding the ore, subjecting the ground ore to an leaching step in the presence of an alkaline material (which may be lime and limestone) and oxygen as the oxidising agent, adjusting the leaching step such that the amount of oxidation is between 9%-20%, and subjecting the partially oxidated ore/concentrates to a cyanide extraction step.

The refractory ore/concentrate may comprise a sulphide ore, a carbonaceous ore, pyrites, arsenopyrite, stibnite and may contain other compounds such as selenium and tellurium.

The ore/concentrate is typically finely ground to a p80 of <20 microns. Various devices are commercially available to grind a solid to this particle size.

The alkaline leaching step is preferably conducted at a temperature of between 60-95° as this can provide a further reduction in the consumption of cyanide during the extraction process. For instance, the amount of cyanide consumed at 70-85° is approximately half of that consumed at between room temperature-50° by solids partially oxidised.

The leaching step can be conducted to provide a sulphide oxidation of between 8-15% by solids partially oxidized. The oxidation is typically carried out using oxygen introduced into a leach reactor. When the desired level of sulphide oxidation had occurred, oxygen is no longer added to the reactor.

The alkaline conditions (more correctly conditions which are less acidic than the very well-known acid leaching in sulphuric acid) can be maintained using limestone and lime. The amount of lime can be between 8%-20%. The pH of the leach is typically maintained between 5-7.

The leached solution is then typically subjected to a cyanide extraction step to extract the gold and other precious minerals from the ore/concentrate.

Initial oxidation of the finely ground ore/concentrates to about 12%, as opposed to almost fully oxidising the ore/concentrate allows a gold extraction of approximately 90% and a sodium cyanide consumption of approximately 2 kg per ton of ore.

As a comparison, leaching a finely ground ore/concentrate without partial oxidation consumed approximately 16-20 kilograms of sodium cyanide per ton of ore.

The best conditions seem to be to fine grind the initial ore/concentrate, only partially oxidise the finely ground material to @12%, keep the temperature to between 60-85 degrees C., and use a lime/limestone mixture to keep the pH level alkaline.

Fine grinding already results in a decrease of cyanide consumption relative to unground product. Partial oxidation provided a further reduction in cyanide consumption relative to unoxidised material. Maintaining the temperature at between 60-85 provided a further reduction in the cyanide consumption.

form of free gold, gold telluride, fine gold locked in sulphide and gangue minerals and invisible gold. The method of fine grinding followed by the limestone/lime/oxygen method of sulphide oxidisation was chosen for these tests. Only small amounts of these reagents were added with the aim of partially oxidising sulphides to provide incremental recovery of invisible gold. The concentrate was finely ground to p80 sizings between 9 and 16 microns and leached with oxygen and an 85%:15% mixture of limestone and lime at 80° C. The pre-treated oxidised residues from these oxidative leach tests were then leached at pH 10.5 with 500 ppm free cyanide. The gold recovery from the oxidised residue ranged from 86.4% to 94.1%.

A surprising and unexpected result was that the cyanide consumption decreased with increasing oxidation from 6.2 kg/t to 2.4 kg/t for the final residue. The cyanide consumption appeared to undergo a step change for samples ground finer than p80≈11.4 and averaged 2.5 kg/t. Further tests were carried out to clarify this result. Unoxidised pyrite concentrates were leached under the conditions shown in Table 1 below. First, unground concentrate with p80~70µ was leached, then concentrate finely ground to a p80 of 9.1 and 10.9µ respectively was leached with 500 ppm free cyanide and finally 2000 ppm free cyanide and 20 kg/t lime. These show a 2-4 times increase in sodium cyanide consumption for leaching finely ground concentrate compared with leaching unground concentrate.

TABLE 1

Results on Unoxidised Concentrates Cyanide Leach Tests

| Concentrate Sample | Test Description | Ultrafine Grind p80 | CYANIDATION | | | | |
|---|---|---|---|---|---|---|---|
| | | | Free Cyanide level - ppm | Au Rec - % | Ag Rec - % | NaCN Cons - kg/tonne | Lime Cons - kg/tonne |
| 1 | As received - 500 ppm free cyanide | As received - p80≈70µ | 500 | 57.5 | 53.3 | 2.55 | 2.18 |
| 2 | As received - 500 ppm free cyanide | As received - p80≈70µ | 500 | 55.6 | 41 | 3.78 | 3.68 |
| 1 | UFG - 500 ppm free cyanide | 9.1 | 500 | 71.6 | 50 | 7.09 | 13.69 |
| 2 | UFG - 500 ppm free cyanide | 10.9 | 500 | 71.71 | 48 | 9.54 | 11.2 |
| 1 | UFG - 2000 ppm free cyanide, 20 kg/t lime | 9.1 | 2000 | 86.0 | 71 | 10.4 | 20 |
| 2 | UFG - 2000 ppm free cyanide, 20 kg/t lime | 10.9 | 2000 | 87.6 | 79 | 11.5 | 20 |

Using the process according to the invention, leaching of the ore/concentrate was completed within 8-24 hours as opposed to 54-72 hours for the unoxidised material.

BEST MODE

Figure 1:
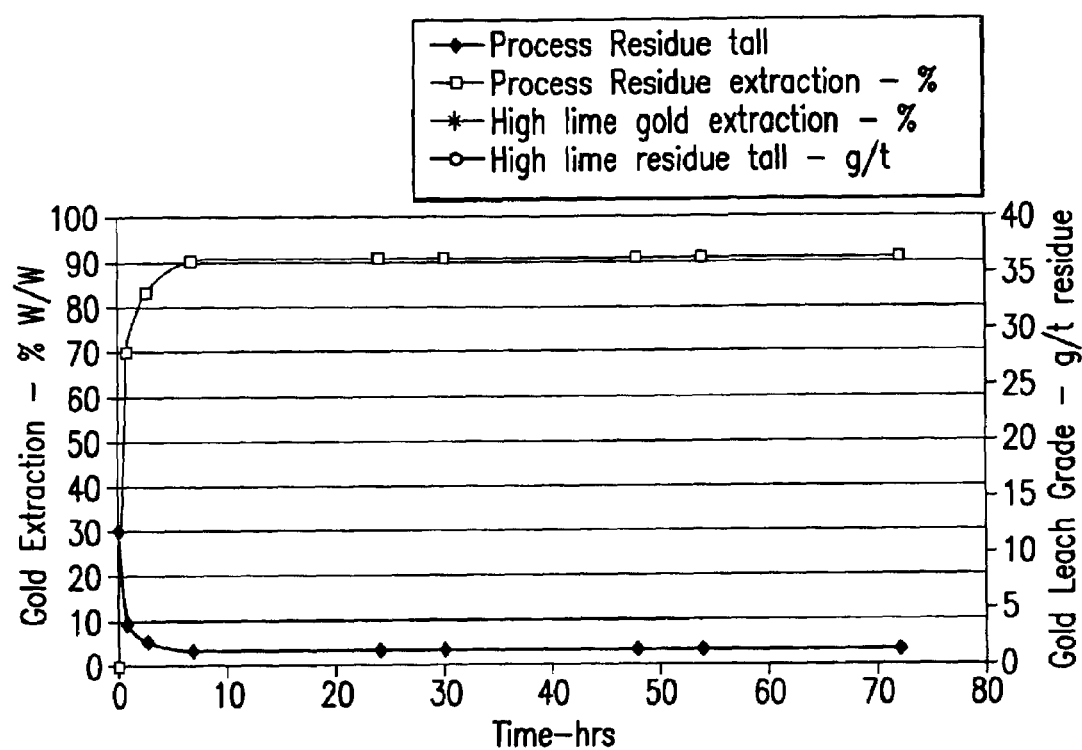
FIG. 1 is a graph showing process oxidized residue vs. finely ground concentrate: comparative CIL Kinetics.

In seeking to treat gold ores and concentrates which contain a mixture of cyanide leachable gold and refractory gold, tests were carried out on a material with these properties in which the gold concentrates containing circa 40 g/t gold in the Two pyrite concentrates containing 33 and 34 g/t gold, with the gold in the form of free gold, gold tellurides, invisible gold in pyrite and fine gold particles locked in sulphide and gangue minerals was ground in a horizontal bead mill to a p80 of circa 10µ. The concentrate was oxidatively leached with oxygen and 130 kg/t of limestone/lime mixture in the ratio 110%/20% at 80° C. for 24 hours. The aim of the tests was to oxidise less than 10% of the sulphide sulphur. The partly oxidised concentrate was cyanide leached under the conditions shown in Table 2 below.

The results show that when the ground concentrate was oxidised by only 9-11% of its sulphide sulphur content, and cyanide leached for gold recovery that the cyanide consumption was reduced by more than two thirds compared to the finely ground, unoxidised material.

TABLE 2

Results of Cyanide Leach Tests on Oxidised Residues

| | | | | CYANIDATION | | | |
|---|---|---|---|---|---|---|---|
| Concentrate Sample | Ultrafine Grind p80 | % Sulphur Oxidation | Free Cyanide level - ppm | Au REC - % | Ag REC - % | NaCN CONS - kg/tonne | Lime CONS - kg/tonne |
| 1 | 9.1 | 0 | 500 | 71.6 | 50 | 7.09 | 13.7 |
| 1 | 9.1 | 0 | 2000 | 86.0 | 71 | 10.4 | 20 |
| 1 | 16.14 | 12.7 | 500 | 86.40 | 54.55 | 6.2 | 4.4 |
| 1 | 11.1 | 9.8 | 500 | 85.4 | 58.4 | 2.1 | 20 |
| 1 | 11.1 | 9.8 | 5000 | 86.4 | 58 | 3.7 | 20 |
| 1 | 11.1 | 13.4 | 500 | 86.8 | 68 | 2.63 | 20 |
| 2 | 10.9 | 0 | 500 | 71.7 | 48 | 9.54 | 11.2 |
| 2 | 10.9 | 0 | 2000 | 87.6 | 79 | 11.5 | 20 |
| 2 | 10.9 | 8.7 | 2000 | 87.8 | 91.7 | 4.09 | 20 |
| 2 | 10.9 | 16.9 | 2000 | 89.6 | 90 | 4.67 | 20 |
| 2 | 10.9 | 9.8 | 2000 | 84.9 | 75 | 9.11 | 20 |
| 2 | 10.9 | 10.4 | 2000 | 86.7 | 82 | 6.78 | 20 |
| 2 | 10.9 | 10.6 | 2000 | 88.5 | 80 | 4.55 | 20 |
| 2 | 10.9 | 12 | 2000 | 90.1 | 80 | 5.55 | 20 |
| 2 | 10.9 | 11.4 | 2000 | 90.9 | 82 | 4.48 | 20 |

Effect of Temperature

To further test the effectiveness of alkaline oxidation for reducing cyanide consumption, oxidation tests using 85% limestone/15% lime, oxygen and 20% w/w solids were carried out for 24 hours at 50, 60, 70 and 80° C. The oxidised pulps were leached with sodium cyanide at pH 10.5 as described in Table 3 below and cyanide consumption measured. These results show that the greatest reduction in cyanide consumption occurred at 70 and 80° C.

TABLE 3

Effect of Oxidative Leach Temperature on Cyanide Consumption

| Concentrate Sample | Ultrafine Grind p80 | Leach Time (hrs) | % Sulphur Oxidation | Leach Temperature (° C.) | Gold Recovery (%) | Cyanide Consumption (kg/t) | Lime Addition (kg/t) |
|---|---|---|---|---|---|---|---|
| 2 | 10.9 | — | 0 | — | 71.7 | 9.5 | 20 |
| 2 | 10.9 | 24 | 9.8 | 50 | 84.9 | 9.11 | 20 |
| 2 | 10.9 | 24 | 10.4 | 60 | 86.7 | 6.78 | 20 |
| 2 | 10.9 | 24 | 10.6 | 70 | 88.5 | 4.55 | 20 |
| 2 | 10.9 | 24 | 11.4 | 70 | 90.9 | 4.48 | 20 |
| 2 | 10.9 | 24 | 8.7 | 85 | 87.8 | 4.09 | 20 |

Continuous Leach Testing

Trials were carried out to test the cyanide consumption of materials oxidised in a flow system.

The principle variables trialled were the level of sulphide oxidation, vessel temperature, which was varied in the range 60-70 degrees, and the blend of limestone and lime components in the alkali added to the leach.

A single concentrate sample was used in all of the continuous testing, and an analysis of this sample is listed below in Table 4.

TABLE 4

Head Analysis Concentrate Sample

| Element | Sample 2 |
|---|---|
| Fe - % w/w | 32.8 |
| Cu - ppm | 2450 |
| Ag - ppm | 16 |
| Te - ppm | 213 |
| Au - ppm | 38.1 (39.4 repeat) |
| S - % w/w | 39.6 |

The concentrate sample consisted predominantly of pyrite, with silica, sericite, muscovite and chlorite making up the major gangue components. The sample contained 213 ppm tellurium; however no tellurides were visible under optical microscope. The sample contained a minor amount of calcite, and had an 80% passing size of 91.5 microns.

The continuous leach run was carried out as follows:
  100 kg of concentrate was finely ground as feed to a continuous reactor and split into representative 20 kg sub samples. The slurry was ground to 80% passing 12 microns, and sent for head analysis.

A three stage continuous oxidative leach reactor was set up and commissioned. The reactor was designed to operate for 24 hours per day with continuous feed of both concentrate and alkali slurry at measured rates. Discharge from the leach was to be gravitated to a thickener for thickening, with the thickener overflow stream used as makeup water to the feed and alkali circuits.

The continuous leach reactor was operated under the following conditions:

| Operating Parameter | Target level |
|---|---|
| Run No. 1 | |
| Slurry Density in Oxidative leach | 20% |
| Operating Temperature | 70° C. |
| Residence Time | 12 hrs |
| Alkali Blend | 20% lime/80% limestone |
| Target Sulphide Oxidation Level | Start at 8% w/w and progressively increase to 14% w/w by control of exit pH and alkali addition |
| Alkali addition - kg/tonne | 90-110 kg/tonne, adjusted to match targeted level of sulphide oxidation |
| Run No. 2 | |
| Slurry Density in Oxidative leach | 20% |
| Target Sulphide Oxidation Level | 12-14% (aim 12.5%) |
| Operating Temperature | 60° C. |
| Residence Time | 12 hrs |
| Alkali Blend | 20% lime/80% limestone |
| Alkali addition - kg/tonne | 100 |
| Run No. 3 | |
| Slurry Density in Oxidative leach | 20% |
| Target Sulphide Oxidation Level | 12-14% (aim 12.5%) |
| Operating Temperature | 70° C. |
| Residence Time | 12 hrs |
| Alkali Blend | 8% lime/92% limestone |
| Alkali addition - kg/tonne | 100 |

Ultrafine Grinding

Fine grinding of the pyrite concentrate was carried out in a four liter Netzsch horizontally stirred bead mill. The mill was fitted with a 4 liter chamber and disc style agitator. The grinding media was screened 1-3 mm river sand. The mill was fitted with an AC inverter for accurate determination of the mill power draw and operating rpm. The feed slurry was sampled initially for particle size determination by a Laser-sizer. The entire feed sample was ground to a size of p80≈12 microns Continuous Stirred Reactor The continuous leach reactor consisted of three stainless steel vessels connected in series using overflow ports. Each reactor had a live volume of 5 liters and an aspect ratio of 1. Each reactor was baffled to prevent solution vortexing, and agitated by a 100 mm diameter radial impeller. Oxygen was introduced into each reactor by air spear, which terminated directly below the impeller. Oxygen flow was controlled off a pressure cylinder using rotameters.

Each vessel was jacketed, with hot water continuously circulated through the jacket to maintain the temperatures within the leach at the desired level. The outside of the jacket was insulated to minimise heat loss.

The overflow port was located at the top of each reactor, with the inlet port located below the impeller line. This facilitated slurry transport between the vessels.

Discharge from the leach overflowed from the final leach reactor into a 300 mm diameter thickener. Underflow was withdrawn from the thickener regularly and filtered. These filtered samples were used in subsequent cyanidation leaching. Thickener overflow was used to dilute ground slurry and alkali prior to addition to the leach, and also to makeup for evaporative loss across the leach train.

Cyanide Leaching

The partially oxidised leach residues collected during the leaching program were tested for gold and silver recovery by cyanidation in a bottle roll apparatus. Approximately 1000 grams of residue at 35% w/w solids was be added to a 5 HDPE bottle, and the bottle rotated at 30 rpm on a set of rollers. Cyanide and hydrated lime were added to the bottle prior to starting the test.

The Effect of Sulphide Oxidation on Gold Recovery

The main operating parameter that required optimising in the continuous leach run was the level of sulphide oxidation required. The batch testwork had narrowed the target range to 8-14% w/w, however the aim of the continuous test was to reduce the target range to within 1%. This was examined in the first oxidative leach run, with the level of sulphide oxidation varied in the first 250 hours of operation.

Data outlining the effect of the level of sulphide oxidation on the amount of gold recovered from the oxidised residue is shown in Table 5. The cyanide and lime consumption in the cyanide leach is also listed. The level of sulphide oxidation listed in Table 5.4 refers to feed concentrate.

TABLE 5

Effect of Sulphide Oxidation on Gold Recovery from Concentrate Sample

| % Sulphide Oxidation | % mass increase across leach | Gold Recovery - % | NaCN Consumption - kg/tonne of feed concentrate | Lime Consumption - kg/tonne of feed concentrate |
|---|---|---|---|---|
| As received | — | 71.5 | 8.3 | 12.4 |
| 12.5 | 14 | 92 | 2.4 | 1.8 |
| 11.5 | 12.6 | 91 | 2.6 | 2.2 |
| 10 | 11.4 | 88 | 2.4 | 1.5 |
| 9.8 | 10.9 | 87 | 2.8 | 1.6 |
| 9.2 | 9.9 | 86 | 2.4 | 1.5 |
| 8.4 | 9.4 | 85 | 2.5 | 1.4 |
| 6.8 | 7.5 | 84 | 3.4 | 2 |

The sodium cyanide consumption observed for the residue oxidised to a sulphide oxidation of 12.5% was 2.4 kg/tonne of oxidised residue (2.6 kg/tonne of feed), at a lime consumption of 1.65 kg/tonne of oxidised residue (1.8 kg/tonne of feed).

The level of sulphide oxidation in the range given in table 5 (i.e. between 8-14%) did not appear to have much impact on the cyanide consumption, with a cyanide consumption in the range 2.2-2.5 kg/tonne of residue noted at sulphide oxidation levels in the range 8-14%. All of the cyanide leach tests were carried out at a free cyanide level of 500 ppm, and at pH 10.5. Lime was added to the tests to hold the pH at this level, rather than as a single addition and the pH was stable throughout the cyanide leach tests, with low lime consumption observed. The cyanide level was stable throughout the cyanide leach tests, and was easy to control at the target level of 500 ppm.

The Effect of Temperature on Gold Recovery

Leach Run No 1 was carried out at a temperature of 70 degrees, whereas for leach Run No 2 the temperature was lowered to 60 degrees.

The average gold recovery from oxidised residues produced in Leach run No 1, with temperature maintained at 70° C., was 87%, with the gold recovery ranging from 85-90%. The average sodium cyanide consumption was 2.8 kg/tonne, at an average lime consumption of 1-1.5 kg/tonne. The average sulphide oxidation achieved at 70 degrees was 11.5% w/w, with approximately 90-95% of the limestone/lime blend added to the leach consumed in the oxidation.

The data for the second leach run, carried out at 60 degrees, was very similar to Leach Run No 1. The average gold recovery from the oxidised residue was 88%, at an average sodium cyanide consumption of 2.5 kg/tonne, and a lime consumption of 1.4 kg/tonne. The level of sulphide oxidation achieved at 60 degrees was 10.8% w/w on average. The amount of limestone/lime blend consumed in the oxidation was again over 90%.

The potential drawback of lower temperature operation is formation of other iron precipitates, rather than goethite. The colour of the iron precipitate formed at 60° C. was slightly darker than the precipitate formed at 70° C., however there was no detrimental effect on the cyanide consumption of the residue. The settling rates observed for the lower temperature precipitates were slightly lower than noted for the leach residues produced at 70° C., however this effect was only marginal.

The Effect of Alkali Blend

The final variable tested in Leach run No 3 was the amount of lime in the blend, which was decreased from 20% down to 8%. Leach Run No 1 was carried out at a temperature of 70 degrees, with 20% lime present in the alkali blend. Leach Run No 3 was carried out at a temperature of 70 degrees, with the amount of lime in the alkali blend reduced to 8%.

The average gold recovery from oxidised residues produced in Leach run No 1, with 20% lime present in the alkali blend, was 87%, with the gold recovery ranging from 85-90%. The average sodium cyanide consumption was 2.8 kg/tonne, at an average lime consumption of 1-1.5 kg/tonne. The average sulphide oxidation achieved at 70 degrees was 11.5% w/w, with approximately 90% of the limestone/lime blend added to the leach consumed in the oxidation. The sulphide oxidation ranged from 7.5-15%.

The data for the third leach run, carried out with only 8% lime present in the alkali blend, was similar to Leach Run No 1. The average gold recovery from the oxidised residue was 88%, at an average sodium cyanide consumption of 2.6 kg/tonne, and a lime consumption of 1.9 kg/tonne. The lime consumption in the cyanide leach stage was slightly elevated with 8% lime in the alkali blend, compared to residues produced with 20% lime in the alkali blend.

The average level of sulphide oxidation achieved in run No 3 was 11.8% w/w. The amount of limestone/lime blend consumed in the oxidation was again 95%. There was no significant difference between the results of the leach run carried out with 20% lime in the alkali blend relative to run No 3, carried out at 8% lime in the alkali blend.

Elemental and Mineralogical Analysis of the Oxidative Leach

A summary of data collected during Leach Run 3, outlining the varying elemental and mineralogical analysis of the solids phase in each leach reactor is presented in Table 6. Leach Run No 3 was carried out at 70° C., with a lime level of 8% w/w in the alkali blend. The discharge pH from the leach was above 5 throughout the run, and so there was little driving force for the formation of sulphated iron precipitates. The data was collected by chemical analysis and XRD analysis of samples taken from each tank when the leach was operating at steady state.

By the end of the oxidative leach, less than 1% of the mass of the leach residue was made up of limestone, indicating that more than 95% of the alkali added to the leach was consumed in the leach reaction. The amount of alkali consumed, and the amount of pyrite oxidised confirm the anticipated general pyrite leach reaction:

$$FeS_2 + 2CaO + 15/4 O_2 + 5/2 H_2O = FeO.OH + CaSO_4.2H_2O$$

TABLE 6

Analysis of Oxidative Leach Tank Discharge for Run No 3

| Composition | Feed | Tank 3 discharge |
|---|---|---|
| % Fe | 32.8 | 27.5 |
| % S | 34.1 | 30.4 |
| % Si | 6.3 | 5.4 |
| % Ca | 0.15 | 2.4 |
| % FeS$_2$ | 63 | 48 |
| % FeS$_2$ Oxidation | 0.0 | 13.2 |
| % FeO•OH | 0 | 8 |
| % SiO2 | 6.2 | 5.6 |
| % Muscovite | 15 | 16 |
| % Chlorite | 5.4 | 3.45 |
| % Ankerite | 6.6 | 1.4 |
| % CaSO$_4$•2H$_2$O | 0 | 9 |
| % CaCO$_3$ | 0.4 | 0.7 |
| MASS | 100 | 114 |

The mass increase across the oxidative leach was approximately 14%, with the bulk of the increased mass present as goethite and gypsum. Approximately 10% of the final leach residue was made up of gypsum.

Some of the gangue minerals present in the concentrate sample, in particular chlorite and ankerite, were consumed in the oxidative leach. The most likely by products from reaction of these gangue minerals would magnesium and aluminum oxides, which would not be resolved clearly in the XRD analysis, as they tend to be amorphous.

The only iron reaction product identified in the XRD was goethite, FeO.OH. No sulphated iron precipitates were identified by XRD. The leach residues were relatively simple, with few reaction products, which confirmed that the majority of the reacted pyrite leached according to the leach reaction specified above. This simple reaction system greatly simplifies the heat and material balance for the process.

The Effect of Leach Discharge pH on Reagent Consumption in the Cyanide Leach

During the early stages of the continuous run, the leach discharge pH varied, as the amount of alkali added to the leach was varied. The exit pH increased gradually across the first 200 hours of operation, varying from 2-5, before settling down in the range 5-6 once the alkali blend addition was optimised.

The impact of operating the final stage of the leach at lower pH is that the amount of sulphate incorporated into the iron precipitate increases, due to formation of jarosite and iron hydroxy-sulphate phases. Residual iron levels in the solution phase also increase at lower pH. Both of these effects impact on the cyanide consumption in the cyanidation stage.

The effect of leach discharge pH on cyanide and lime consumption in the cyanide leach is outlined in Table 7.

TABLE 7

The Effect of Discharge pH on Reagent Consumption in the Cyanide Leach

| Discharge pH | Residual Iron Tenor in solution - ppm | Gold Recovery - % | NaCN consumption - kg/tonne | Lime consumption - kg/tonne |
| --- | --- | --- | --- | --- |
| 2.5 | 81 | 86 | 8.9 | 4 |
| 3.5 | 12 | 88 | 6.4 | 2 |
| 4.6 | <5 | 88 | 4.1 | 2 |
| 5.5 | <1 | 90 | 2.4 | 1 |
| 6 | <1 | 90 | 2.6 | 1 |

Discharge pH had a significant effect on reagent consumption levels in the cyanide leach. The recommended discharge pH for the leach would be in the range 5-6, to achieve a cyanide consumption of 3 kg/tonne or less.

To achieve this discharge pH and still achieve the desired level of sulphide oxidation, the alkali stream will need to be added to the leach at a slight excess over stoichiometric, and a 10% excess is recommended.

Gold Leach Kinetics in the Cyanide Leach

Table 8, outlines the relative cyanide leach kinetics for a preferred process residue, oxidised to 12% w/w sulphide oxidation, relative to a sample of finely ground concentrate leached under similar conditions.

TABLE 8

Leach Kinetics in the Cyanide Leach Stage

| | Process Residue - 12% oxidation | | | Finely ground concentrate - 25 kg/tonne lime addition | | |
| --- | --- | --- | --- | --- | --- | --- |
| Time - hrs | Tails grade - g/t | Gold Extraction - % w/w | NaCN Consumption - kg/tonne | Tails grade - g/t | Gold Extraction - % w/w | NaCN Consumption - kg/tonne |
| 0.00 | 29.8 | 0.00 | 0.00 | 36.1 | 0.00 | 0.00 |
| 1.00 | 8.9 | 69.9 | 0.20 | 30.2 | 16.2 | 1.9 |
| 3.00 | 4.9 | 83.4 | 0.15 | 26.3 | 27.1 | 3.9 |
| 7.00 | 2.6 | 91.0 | 0.61 | 14.3 | 60.3 | 6.1 |
| 24.00 | 2.7 | 90.7 | 1.13 | 10.6 | 70.4 | 12.2 |
| 30.00 | 2.6 | 91.0 | 1.88 | | | |
| 48.00 | 2.7 | 90.9 | 1.61 | 8.2 | 77.2 | 16.5 |
| 54.00 | 2.7 | 90.9 | 1.69 | | | |
| 72.00 | 2.7 | 90.9 | 2.20 | 5.8 | 83.9 | 18.4 |

The process oxidative pretreatment of the pyrite concentrate results in a significant increase in the cyanide leach kinetics. Leaching of the process residue is essentially complete within 8-24 hours of leaching, compared to 54-72 hours for the un-oxidised finely ground concentrate.

It should be appreciated that various changes and modifications can be made to the invention without departing from the spirit and scope of the invention.

The invention claimed is:

1. A process for extracting a metal from a refractory material containing the metal, the process comprising fine grinding the material, subjecting the ground material to a leaching step carried out at 1 atmosphere or less in the presence of an alkaline material and an oxidizing agent, adjusting the leaching step to produce partially oxidized material, wherein the amount of oxidation of the partially oxidized material is between 9%-20%, and subjecting the partially oxidized material to a cyanide extraction step to recover the metal.

2. The process of claim 1, wherein the refractory material comprises a sulphide, a carbonaceous, a pyrite, an arsenopyrite, or a stibnite ore or concentrate.

3. The process of claim 1, wherein the material is ground to a p80 of <20 microns.

4. The process of claim 1, wherein the alkaline material is selected from lime and limestone.

5. The process of claim 4, wherein the pH of the leaching step is between 5-7.

6. The process of claim 1, wherein the amount of oxidation is between about 9% to about 12%.

7. The process of claim 1, wherein the oxidizing agent is oxygen.

8. The process of claim 1, wherein the leaching step is conducted at a temperature of between 60° C.-95° C.

9. The process of claim 1, wherein the metal is gold or silver.

10. A process for extracting gold or silver from a refractory material containing gold or silver, the process comprising fine grinding the material to a p80 of <20 microns, subjecting the ground material to a leaching step in the presence of an alkaline material which comprising lime and/or limestone and an oxidizing agent which comprises oxygen to produce partially oxidized material, maintaining the pH of the leaching step between 5-7, maintaining the temperature between 60-85 degrees C, adjusting the leaching step such that the amount of oxidation of the partially oxidized material is between about 9%-about 12%, and subjecting the partially oxidized material to a cyanide extraction step to recover the gold or silver.

* * * * *